United States Patent Office 3,213,132
Patented Oct. 19, 1965

3,213,132
PROCESS FOR PREPARATION OF 4-NITROSTILBENES
Albert F. Strobel, Delmar, and Sigmund C. Catino, Castleton, N.Y., assignors to General Aniline & Film Corporation, New York, N.Y., a corporation of Delaware
No Drawing. Filed Dec. 8, 1960, Ser. No. 74,475
8 Claims. (Cl. 260—505)

This invention pertains to an improved method of preparing 4-nitrostilbenes.

In particular it pertains to the preparation of 4-nitrostilbenes by the condensation of a 4-nitrotoluene with a benzaldehyde in the presence of an alkali or alkaline earth metal salt of an arylsulfonamide as basic catalyst.

F. Ullmann and M. Gschwind (Berichte 41, 2291–7) describe a method of condensing 4-nitrotoluenes which are substituted in the 2-position by an electronegative group with aromatic aldehydes. The condensation is effected by employing piperidine as an alkaline condensing agent. The authors specifically state that they were unable to get stilbene formation when an attempt was made to condense 4-nitrotoluene per se with benzaldehyde under similar conditions. In this latter case there is no electronegative substituent in the 2-position of the 4-nitrotoluene.

More recently, in U.S.P. 2,657,228, there is described a method of making 4-nitro-2-stilbenesulfonic acids employing aryl esters of 2-methyl-5-nitrobenzenesulfonic acids as the 4-nitrotoluene component using as catalyst secondary saturated amines, particularly piperidine.

Also in U.S.P. 2,821,550 there is described a direct synthesis of 4-nitro-2-stilbenesulfonic acids by condensation of benzaldehyde and 2-methyl-5-nitrobenzenesulfonic acids in the presence of a secondary amine as catalyst.

In these latter two references, as in the Berichte reference, the position ortho to the methyl group of the 4-nitrotoluene is occupied by an electronegative group, but when this same position is not substituted by an electronegative group none of these methods works to give a practical yield of stilbene compound.

It is furthermore known that strongly basic compounds such as sodium hydroxide and sodium methoxide will act as catalyst in the condensation of 4-nitrotoluene and benzaldehyde to give a stilbene even though there is no electronegative substituent ortho to the methyl group of the 4-nitrotoluene. However, the yield is low.

We have now discovered that the alkali and alkaline earth metal salts of arylsulfonamides are effective catalysts in producing stilbenes in consistently good yields by condensing 4-nitrotoluenes with benzaldehydes. In the case of 4-nitrotoluenes which contain an electronegative substituent in ortho position with respect to the methyl group, it has been found that by employing the alkali and alkaline earth metal salts of arylsulfonamides as catalysts the reaction proceeds at lower temperatures and/or shorter reaction times than with the prior art catalysts, while still obtaining a yield of 4-nitrostilbene equivalent or better than that obtained in the prior art processes. In the case of 4-nitrotoluenes which do not contain an electronegative substituent in 2-position, it has been found that consistently good yields of the 4-nitrostilbene are obtained, whereas with the prior art catalysts either no yield or a low yield of the nitrostilbene was obtained.

In practicing the present invention a 4-nitrotoluene and a benzaldehyde (or naphthaldehyde in case a benzostilbene is the desired product) together with an alkali or alkaline earth metal salt of an arylsulfonamide are heated in an inert solvent which provides at least a limited degree of mutual solubility of the aldehyde, 4-nitrotoluene and arylsulfonamide salt catalyst. Under these conditions the condensation reaction proceeds smoothly resulting in the formation of the desired 4-nitrostilbene. The reaction can be illustrated by the following equation showing the condensation of benzaldehyde with 4-nitrotoluene using the sodium salt of N-methyl benzene sulfonamide as a catalyst:

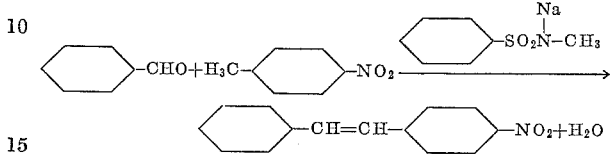

The sulfonamide catalysts which are used in practicing the present invention are the alkali and alkaline earth metal salts of arylsulfonamides wherein the aryl group is illustrated by phenyl and naphthyl which may further contain substituents such as lower alkyl, e.g., methyl, ethyl, dimethyl, halogen such as chloro and bromo, nitro and the like; the amide group may be the free amide group or a mono substituted amide group wherein the substituent may be lower alkyl, such as methyl, ethyl and butyl, cycloaliphatic such as cyclohexyl, aralkyl such as benzyl, aryl such as phenyl and naphthyl and wherein the N-substituent may contain additional inert substituents such as lower alkyl, halogen, nitro and the like; and wherein the alkali and alkaline earth metal salts comprise sodium, potassium, calcium, magnesium.

These arylsulfonamides may be represented by the following formula:

wherein Ar is selected from the group consisting of phenyl and naphthyl; X is selected from the group consisting of hydrogen, halogen, and lower alkyl; R is selected from the group consisting of hydrogen, lower alkyl, halo-substituted lower alkyl, and Ar—X.

Typical arylsulfonamides whose alkali and alkaline earth metal salts are used as catalysts in practicing the present invention comprise:

Benzenesulfonamide
N-methyl and N-ethylbenzenesulfonamide
N-chloroethylbenzenesulfonamide
Benzenesulfonanilide
Benzenesulfon-o-, m- and p-toluidide
Benzenesulfonxylidide
Benzenesulfon-m-chloroanilide
N-methyl-o- and p-toluenesulfonamide
N-methyl-m-chlorobenzenesulfonamide
N-methyl-1-naphthosulfonamide We particularly prefer the N-unsubstituted and N-monoalkyl substituted arylsulfonamides in that the reaction proceeds more readily when they are employed in contrast to the use of the N-aryl substituted arylsulfonamides, although the latter are operative.

Both benzaldehyde per se and also substituted benzaldehydes may be condensed with 4-nitrotoluene in practicing the present invention, it being understood, of course, that if a substituted benzaldehyde is employed a correspondingly substituted stilbene will be produced. The benzaldehyde which may be employed in practicing the present invention may be represented by the following general formulae:

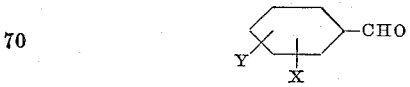

or

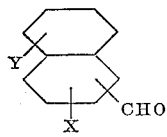

wherein X and Y each represent hydrogen or substituents such as halogen, e.g. chlorine or bromine, nitro, nitrilo, lower alkyl (e.g. methyl or ethyl), —COOH—SO$_3$H and the like. Specific benzaldehydes include Benzaldehyde
o-, m- and p-Chlorobenzaldehyde
2,4- 2,5- and 2,6-dichlorobenzaldehyde
o-, m- and p-Bromobenzaldehyde
o-, m- and p-Nitrobenzaldehyde
2,4-dinitrobenzaldehyde
o-, m- and p-Formylbenzenesulfonic acid
N,N-dimethyl o-, m- and p-formylbenzenesulfonamide
5-chloro-2-formylbenzenesulfonic acid
o- and p-Formylbenzoic acid
m-Nitrilobenzaldehyde
Alpha- or beta-naphthaldehyde Likewise, either 4-nitrotoluene per se or substituted 4-nitrotoluenes may be employed in practicing the present invention, it being understood that when a substituted 4-nitrotoluene is employed a correspondingly substituted 4-nitrostilbene will be produced as the product. The 4-nitrotoluenes which can be employed in practicing the present invention may be illustrated by the following general formula in which X and Y are as defined above:

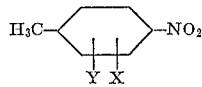

Specific 4-nitrotoluenes are 4-nitrotoluene
2-chloro-4-nitrotoluene
2-bromo-4-nitrotoluene
5-nitro-o-toluenesulfonic acid
N,N-dimethyl-5-nitro-o-toluenesulfonamide
5-nitro-o-toluic acid
6-nitro-m-toluic acid As previously mentioned and as illustrated by the above list of 4-nitrotoluene compounds, it should be emphasized that the use of the alkali and alkaline earth metal salts of N-monosubstituted aryl sulfonamides as condensation catalyst in accordance with the present invention is generally applicable and beneficial in the reaction of benzaldehydes or naphthaldehydes with 4-nitrotoluenes (both those which contain an electronegative substituent in ortho position to the methyl substituent and also those which contain no such electrogenative substituent). For example, if 5-nitro-o-toluenesulfonic acid, which contains an electronegative group o- to the methyl radical, is used in the reaction, the reaction will occur regardless of whether piperidine or other prior art amines are employed or the catalysts of this application; however, if the catalysts of this application are used, a lower temperature and a shorter reaction time may be employed. It is in the case where the reactant does not contain an electronegative substituent o- to the methyl group of the 4-nitrotoluene compound that the use of the catalysts of this application is especially beneficial, since otherwise the reaction will not occur with any degree of satisfaction.

As previously mentioned, the condensation of the benzaldehyde with the 4-nitrostilbene in the presence of the sulfonamide catalyst of the present invention is carried out in the presence of an inert solvent in which the aldehyde, catalyst and 4-nitrotoluene have at least a limited degree of mutual solubility. The particular solvent which is employed will depend to a large extent on the substituents (and resulting solubility properties) of the particular aldehyde, nitrotoluene or sulfonamide catalyst which is employed. Thus, if a solubilizing group such as a sulfonic acid substituent is present in both the aldehyde and 4-nitrotoluene so that both reactants are soluble in water, the reaction may advantageously be carried out in water since in this medium both reactants and catalyst are soluble. When a solubilizing group like the sulfonic acid group is present in the aldehyde, as for instance in 3-formylbenzene sulfonic acid, but the p-nitrotoluene employed contains no water solubilizing group as for example when p-nitrotoluene itself is used, then a sufficient amount of an inert mutual solvent, such as triethanol amine, polyoxyethylene (Carbowax) and the like, should be employed in order to bring the reactants into sufficient common solution. When neither the aldehyde nor the 4-nitrotoluene derivative contains a water solubilizing group, it is necessary to introduce a certain amount of solvent so as to bring the salt of the arylsulfonamide into solution with the reagents since the salt of the arylsulfonamide is too insoluble in the mixture of aldehyde and 4-nitrotoluene to bring about such reaction.

The optimum temperature and reaction time depend to a great extent on the nature of the substituent in the 2-position of the 4-nitrotoluene and only slightly on the aldehyde substituents. The temperature may range from about 50–150° C., although a temperature above 110° C. is rarely used since above 110° C. the reaction of 4-nitrotoluene with itself becomes relatively more important especially when using the more alkaline catalysts of this invention. When the 2-position contains a halogen atom such as chlorine a somewhat lower condensation temperature and shorter time are required than when the 2-position is unsubstituted. When the 2-position contains a strongly electronegative substituent such as nitrilo or sulfo groups the reaction proceeds much easier at a lower temperature and shorter time. Also while with the strongly electronegative substituent in 2-position a less basic catalyst like piperidine (as described in the Ullmann reference cited above) can be used, a higher reaction temperature and longer time are required.

The amount of solvent used to produce mutual solubility of aldehyde, catalyst and 4-nitrotoluene can be varied from about one-third of the amount of either reagent to ten times as much as either reagent. The solvents may be polyethylene glycols, polypropylene glycols, Cellosolves (monoalkyl ethers of glycol), dioxane, alcohols, tertiary amines and alkylolamines, water, and in many cases diluents like benzene, ethylene dichloride, etc. It has been observed however that the hydroxylic solvents have a definite lowering influence on yield compared with other solvents.

Usually, the amounts of the reagents employed involves using equimolecular amounts of each, but as much as five-fold excess of either reagent may be used especially if it is an inexpensive, readily available material compared with the other reagent. The amount of arylsulfonamide catalyst may vary from about 2%–25% of the amount of the aldehyde, and in fact, the addition of even much larger amounts of basic catalyst has little adverse effect.

The details of the present invention will be apparent to those skilled in the art from a consideration of the following examples which illustrate and describe preferred embodiments of our invention:

EXAMPLE 1

*Preparation of 4′-nitrostilbene-3-sulfonic acid*

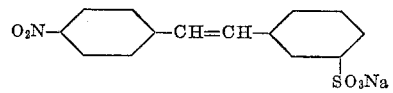

To a 500 ml. flask fitted with a stirrer, thermometer, reflux condenser, calcium chloride drying tube, and nitrogen inlet tube was added 85 mls. of "Carbowax 400" (polyethyleneglycol of average molecular weight=400), 64.8 gms. of the sodium salt of 3-formylbenzenesulfonic acid (80.2% material=0.25 mole aldehyde, containing about 19% of the disodium salt of 3-carboxybenzenesulfonic acid), 10.6 gms. of the sodium salt of N-methyl-p-toluenesulfonamide, and 37.7 gms. of 4-nitrotoluene (0.275 mole). This mixture was stirred at 75° C. for 20 hours. It was then diluted with 250 mls. water and adjusted to ph=7 by addition of 50% sulfuric acid. The slurry was extracted by shaking with two 250 ml. portions of toluene, then separating the layers. The water layer was diluted to 2 liters volume by addition of water. The material was adjusted to pH=12 by addition of sodium hydroxide. It was heated to 70° C., 2 grs. "Super-Cel" (diatomaceous earth) was added and the slurry was filtered through a bed of Super-Cel. The insoluble precipitate on the funnel was washed free of soluble material and the total filtrate was diluted to a volume of 2500 mls. There was added 490 gms. sodium chloride and the material was cooled for several hours at 5° C., then filtered. The presscake was washed with 100 mls. 20% salt solution. The cake was dried to give about 70 gms. of dry material representing about 60% yield of 4'-nitrostilbene-3-sulfonic acid (based on the amount of 3-formylbenzenesulfonic acid used).

EXAMPLE 2

*Preparation of 4-nitrostilbene-2,3'-disulfonic acid*

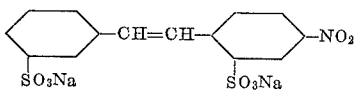

A solution of 64.8 gms. of the sodium salt of 3-formylbenzenesulfonic acid (80.2% material=0.25 mole aldehyde containing about 19% of the disodium salt of 3-carboxybenzenesulfonic acid), 10.6 grams of the sodium salt of N-methyl-p-toluenesulfonamide, and 74.7 gms. of 2-methyl-5-nitrobenzenesulfonic acid (80% material, 20% sodium chloride=0.25 mole), and 200 mls. water are heated at 100° C. for 4 hours. There is then added 40 gms. sodium chloride and 250 mls. saturated salt solution. The resulting precipitate is filtered. It consists principally of

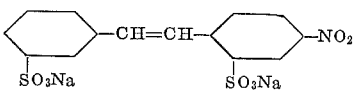

together with a small amount of 2-methyl-5-nitrobenzenesulfonic acid, sodium salt. Reslurrying of the material in 8% sodium chloride to make a thick slurry, followed by filtration, removes practically all of the 2-methyl-5-nitrobenzenesulfonic acid, leaving

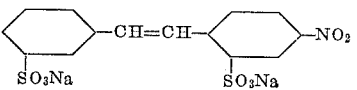

containing sodium chloride after drying.

EXAMPLE 3

*Preparation of*

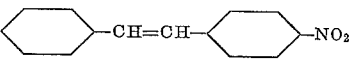

24.1 gms. of the sodium salt of p-toluenesulfonamide (0.125 mole) and 75 mls. of triethanolamine were stirred to give a smooth slurry in a 500 ml. flask equipped with a stirrer, thermometer, condenser and hot water bath. Then 26.5 gms. benzaldehyde (0.25 mole) and 34.3 gms. 4-nitrotoluene (0.25 mole) was added. The material was stirred 40 hours at 80° C. To the flask was then added 200 mls. glacial acetic acid. The yellow slurry was stirred 1 hour at 30° C. and filtered. The filter cake was washed with 75 mls. glacial acetic acid. The presscake was reslurried with 150 mls. water, and the pH was raised to 12 by adding sodium hydroxide solution. The slurry was heated to 65° C. and filtered. The presscake was washed with 250 mls. water, with 35 mls. glacial acetic acid, and with 100 mls. water, then dried to give 4-nitrostilbene crude. The product was recrystallized from glacial acetic acid, after first filtering material insoluble in glacial acetic acid, to give pure 4-nitrostilbene.

EXAMPLE 4

*Preparation of*

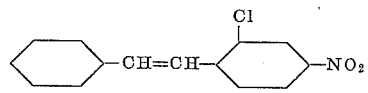

This product was prepared in the same manner as the product of Example 3, substituting equimolecular amounts of 2-chloro-4-nitrotoluene for 4-nitrotoluene used in Example 3.

EXAMPLE 5

*Preparation of*

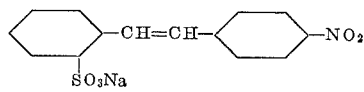

This product was prepared in the same manner as the product of Example 1, using an equimolecular amount of benzaldehyde-2-sulfonic acid for benzaldehyde-3-sulfonic acid. The above product, less soluble in water than the product of Example 1, may be salted out using only one-fifth of the final amount of salt before isolation.

We claim:

1. In a process for the preparation of 4-nitrostilbenes by the condensation at a temperature of from 50° C. to 150° C. and in the presence of an inert solvent of a 4-nitrotoluene of the general formula

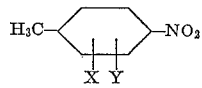

wherein X and Y are selected from the group consisting of hydrogen, halogen, nitro, nitrilo, lower alkyl, —COOH, —SO₃H, with a benzaldehyde selected from the group consisting of

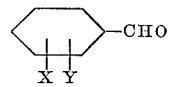

and

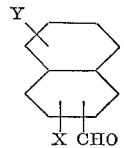

wherein X and Y are selected from the group consisting of hydrogen, halogen, nitro, nitrilo, lower alkyl, —COOH, and SO₃H, in the presence of an alkaline condensing agent, the improvement which comprises employing as said alkaline condensing agent a metal salt of an arylsulfonamide of the formula

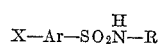

wherein Ar is selected from the group consisting of phenyl and naphthyl; X is selected from the group consisting of hydrogen, halogen, and lower alkyl; R is selected from the group consisting of hydrogen, lower alkyl, halo-substituted lower alkyl, and Ar—X; said metal being selected from the group consisting of an alkali metal and an alkaline earth metal.

2. The process as defined in claim 1 wherein the benzaldehyde specified is 3-formylbenzenesulfonic acid.

3. The process as defined in claim 2 wherein the alkaline condensing agent specified is N-methyl-p-toluenesulfonamide.

4. The process as defined in claim 3 wherein the 4-nitrotoluene specified is unsubstituted 4-nitrotoluene.

5. The process as defined in claim 4 wherein the condensation is effected at a temperature of from 50° C. to 110° C. and the inert solvent specified is a polyethyleneglycol having an average molecular weight of 400.

6. The process as defined in claim 1 wherein the 4-nitrotoluene specified is unsubstituted 4-nitrotoluene.

7. The process as defined in claim 6 wherein the alkaline condensing agent specified is sodium salt of N-methyl-p-toluenesulfonamide.

8. The process as defined in claim 6 wherein the condensation is effected at a temperature of from 50 to 110° C. and the inert solvent specified is a polyethylenegylcol having an average molecular weight of 400.

References Cited by the Examiner

UNITED STATES PATENTS

| | | | |
|---|---|---|---|
| 2,821,550 | 1/58 | Strobel | 260—505 |
| 3,130,218 | 4/64 | Cofrancesco | 260—465 |

FOREIGN PATENTS 226,293  10/58  Australia.

OTHER REFERENCES

Thiele et al.: Chem Ber., vol. 34, pp. 2842–2843.

LORRAINE A. WEINBERGER, *Primary Examiner.*

LEON ZITVER, HAROLD G. MOORE, *Examiners.*